(12) United States Patent
Vodanovic

(10) Patent No.: US 8,144,968 B2
(45) Date of Patent: Mar. 27, 2012

(54) METHOD AND APPARATUS FOR SCANNING SUBSTRATES

(75) Inventor: Bojko Vodanovic, Baie d'Urfé (CA)

(73) Assignee: Aceris 3D Inspection Inc., Baie d'Urfé (CA)

( * ) Notice: Subject to any disclaimer, the term of this patent is extended or adjusted under 35 U.S.C. 154(b) by 530 days.

(21) Appl. No.: 12/352,362

(22) Filed: Jan. 12, 2009

(65) Prior Publication Data

US 2010/0177951 A1    Jul. 15, 2010

(51) Int. Cl.
    *G06K 9/00*    (2006.01)
(52) U.S. Cl. ........................................... 382/141
(58) Field of Classification Search .......... None
See application file for complete search history.

(56) References Cited

U.S. PATENT DOCUMENTS

| | | |
|---|---|---|
| 5,956,134 A | 9/1999 | Roy et al. |
| 6,118,540 A | 9/2000 | Roy et al. |
| 6,134,013 A | 10/2000 | Sirat et al. |
| 6,167,148 A | 12/2000 | Calitz et al. |
| 6,205,238 B1 | 3/2001 | Ma |
| 6,547,409 B2 | 4/2003 | Kiest et al. |
| 6,750,974 B2 | 6/2004 | Svetkoff et al. |
| 6,765,666 B1 | 7/2004 | Guest et al. |
| 6,915,006 B2 | 7/2005 | Beaty et al. |
| 7,034,272 B1 | 4/2006 | Leonard et al. |
| 2005/0030528 A1 | 2/2005 | Geffen et al. |
| 2005/0062961 A1 | 3/2005 | Uto et al. |
| 2008/0260262 A1* | 10/2008 | Lim et al. ............... 382/218 |

FOREIGN PATENT DOCUMENTS

WO    WO-2006/065437 A2    6/2006

\* cited by examiner

*Primary Examiner* — Tu Nguyen
(74) *Attorney, Agent, or Firm* — Goudreau Gage Dubuc; Hugh Mansfield

(57) ABSTRACT

A method and apparatus for scanning and acquiring 3D profile line data of an object, illustratively for use in an optical inspection system. A 3D scanning subsystem is provided in relative movement to the object being scanned. The subsystem is capable of simultaneously scanning different regions of the object with different exposure lengths.

21 Claims, 5 Drawing Sheets

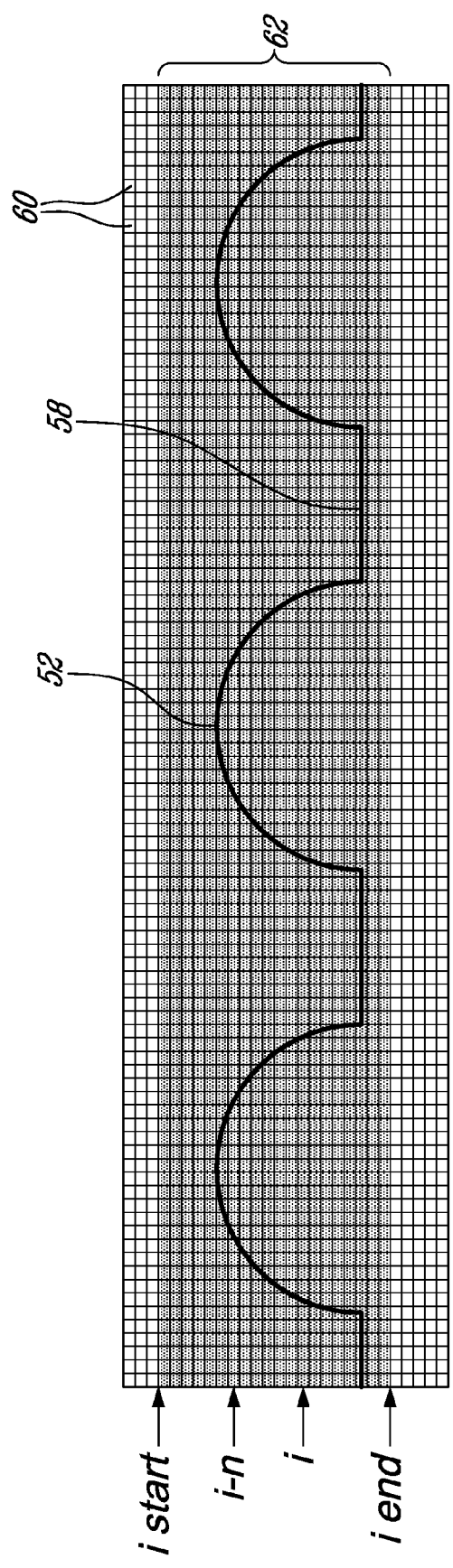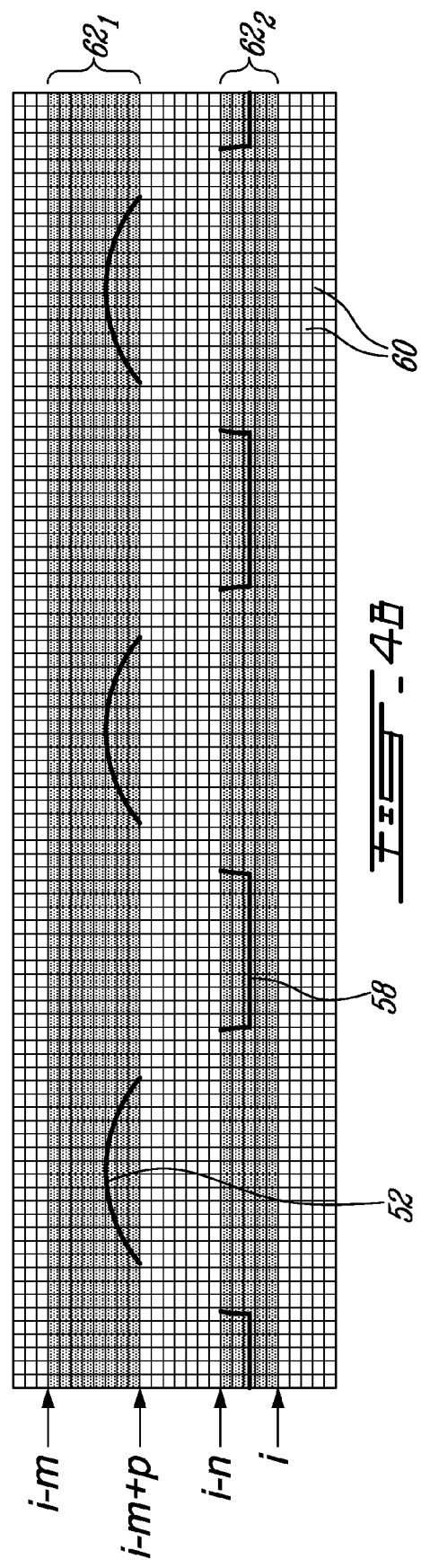

METHOD AND APPARATUS FOR SCANNING SUBSTRATES

FIELD OF THE INVENTION

The present invention relates to a method and apparatus for scanning substrates. In particular, the present invention relates to a method for scanning substrates as well as PCB boards, wafers and the like using with a plurality of wafer bumps deposited thereon using different light exposures for scanning at least a portion of the wafer bumps and the substrate surface.

BACKGROUND OF THE INVENTION

Wafer bumping is a method of packaging silicon for high density and high frequency applications. With the bumping process being constantly improved and cost decreasing, this interconnect method is becoming more popular. As a result, it is increasingly important to identify defective wafer bumps (e.g. too large, small or missing bumps) in order to prevent device failures, which may lead to wasted time testing the defective die and packaging expense.

As known in the art, most optical systems, such as confocal, interferometry, or moiré, which perform 3D criteria inspection of wafer bumps (e.g. extract information related to bump diameter, height, intensity, area, position, as well as defect detection) are typically required to remain completely still in order to acquire a plurality of images of a relatively small wafer area. This results in significant overhead in accelerating, traveling and decelerating times and waiting for the motion to settle down after the system has moved to a new position. Another drawback in this case is that the motion system is heavy and expensive as it is highly susceptible to excessively high acceleration and deceleration, self induced vibrations, as well as wear and tear.

In addition to the above drawbacks, another disadvantage of such prior art scanning systems is that the length of exposure is the same regardless of the portion of the object being scanned. As a result, if the length of exposure is optimised for one part of the object, other portions of the object may end up being scanned in a suboptimal manner. For example, in the case of a wafer bump type substrate the wafer surface is substantially flat and highly reflective. On the other hand the bumps, having generally curved upper surfaces, disperse light. The resulting contrast between the upper surfaces of the bumps and the wafer surface is very high and as a result use of the same length of exposure for the top of the wafer bumps and the wafer surface leads to suboptimal results. As a result, the 3D data (the height and intensity measurements in particular) collected and represented on the object image is generally of poor quality and accuracy.

SUMMARY OF THE INVENTION

In order to address the above and other drawbacks there is provided a method for differentially exposing an object comprising a first region and a second region separate from the first region. The method comprises providing a collimated beam of light, providing an array of light sensitive elements, and simultaneously illuminating at least a portion of the first region and at least a portion of the second region with the beam. The first region portion illuminated by the beam is within a field of view of a first set of elements and the second region portion illuminated by the beam is within a field of view of a second set of elements. The first set of elements is different from the second set of elements, the first set of elements are exposed to light emitted by the beam for a first amount of time and the second set of elements are exposed to light emitted by the beam for a second amount of time different from the first amount of time.

There is also disclosed a method for acquiring 3D optical inspection data of an object comprising distinct first and second regions. The method comprises providing a 3D optical scanning system comprising a laser beam emitting a beam stripe and an array of light sensitive elements, providing relative movement between the object and the scanning system, and triggering profile line data acquisition of the 3D optical scanning system as a function of the relative movement, the profile line data acquisition comprising illuminating at least a portion of the first region and at least a portion of the second region with the beam stripe, wherein the first region portion illuminated by the beam stripe is within a field of view of a first set of elements and the second region portion illuminated by the beam stripe is within a field of view of a second set of elements, wherein the first set of elements is different from the second set of elements, the first set of elements are exposed to the beam for a first amount of time and the second set of elements are exposed to the beam for a second amount of time different from the first amount of time.

Also there is provided a method for inspecting an object comprising distinct first and second regions. The method comprises providing a 3D optical scanning system comprising a laser beam emitting a beam stripe and an array of light sensitive elements, providing relative movement between the object and the scanning system, triggering profile line data acquisition of the 3D optical scanning system as a function of the relative movement, the profile line data acquisition comprising illuminating at least a portion of the first region and at least a portion of the second region with the beam stripe, wherein the first region portion illuminated by the beam stripe is within a field of view of a first set of elements and the second region portion illuminated by the beam stripe is within a field of view of a second set of elements, wherein the first set of elements is different from the second set of elements, the first set of elements are exposed to the beam for a first amount of time and the second set of elements are exposed to the beam for a second amount of time different from the first amount of time, and generating a 3D model of the object using the profile line data.

Additionally, there is provided an apparatus for providing 3D differential scanning of a substantially flat substrate having a plurality of raised bumps arranged along a surface thereof. The apparatus comprises a laser emitting a beam stripe having a Rayleigh range, an array of light sensitive pixels, wherein the array and the laser are positioned relative to the substrate such that the surface of the substrate illuminated by the beam stripe is within a field of view of a first set of pixels and the raised bumps illuminated by the beam stripe are within a field of view of a second set of pixels, and a support for supporting the substrate, the support and the laser moveable relative to one another such that the beam stripe moves along the substrate surface while maintaining the substrate surface and the raised bumps illuminated by the beam stripe within the Rayleigh range. The first set of pixels and the second set of pixels do not overlap and further wherein a time of exposure of the first set of pixels is shorter than a time of exposure of the second set of pixels.

BRIEF DESCRIPTION OF THE DRAWINGS

FIGS. 4A and 4B are front plan views of a sensor of a 3D camera providing an illustration of the manner in which differential exposure is achieved in accordance with an illustrative embodiment of the present invention;

DETAILED DESCRIPTION OF THE ILLUSTRATIVE EMBODIMENTS

Figure 1:
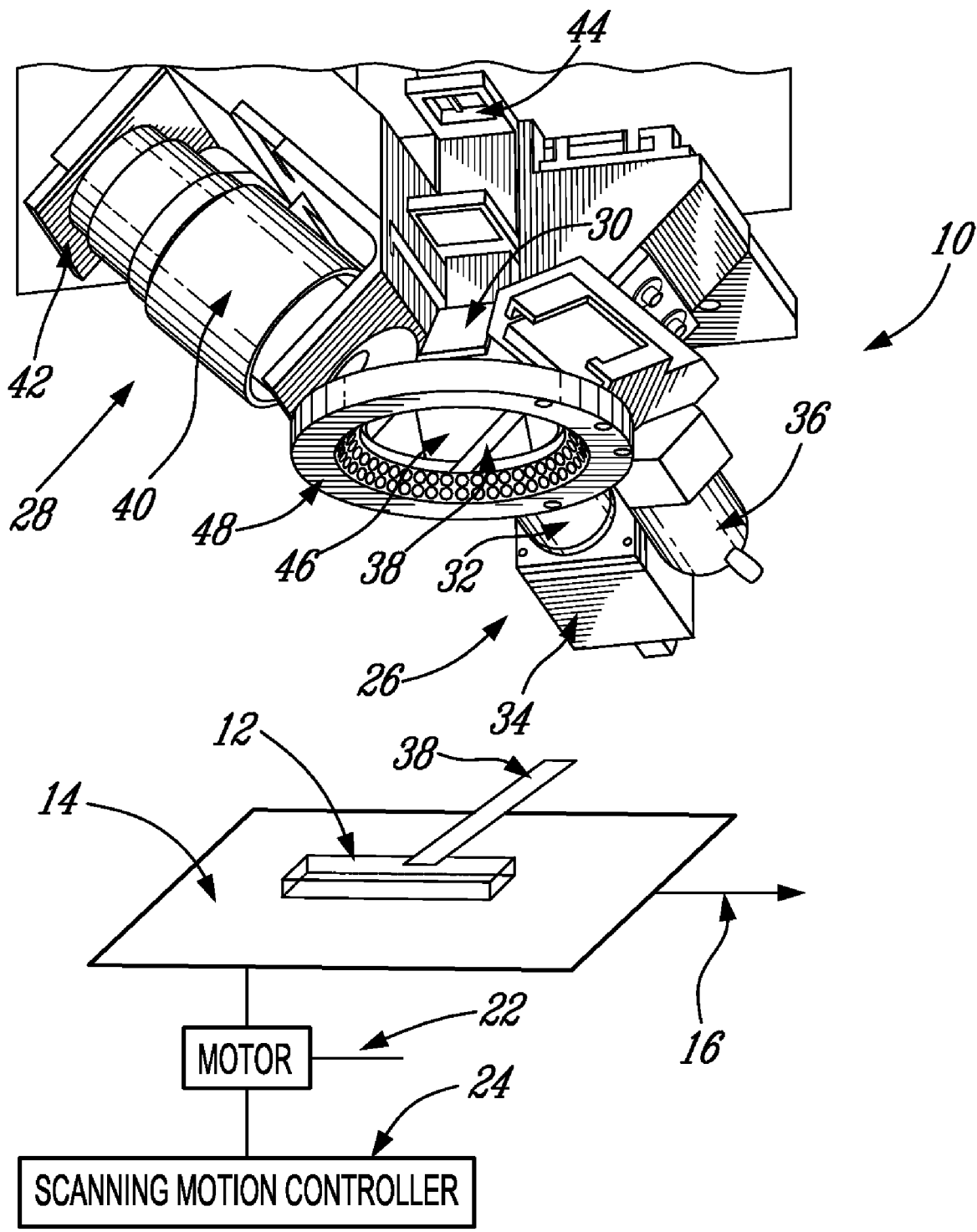
FIG. 1 is a schematic diagram of a wafer bump optical inspection system in accordance with an illustrative embodiment of the present invention.

Referring now to FIG. 1, an optical wafer bump inspection system, generally referred to using the reference numeral 10, will now be described. The system 10 allows for 2D and 3D optical scanning to be carried out simultaneously without interference.

Figure 2:
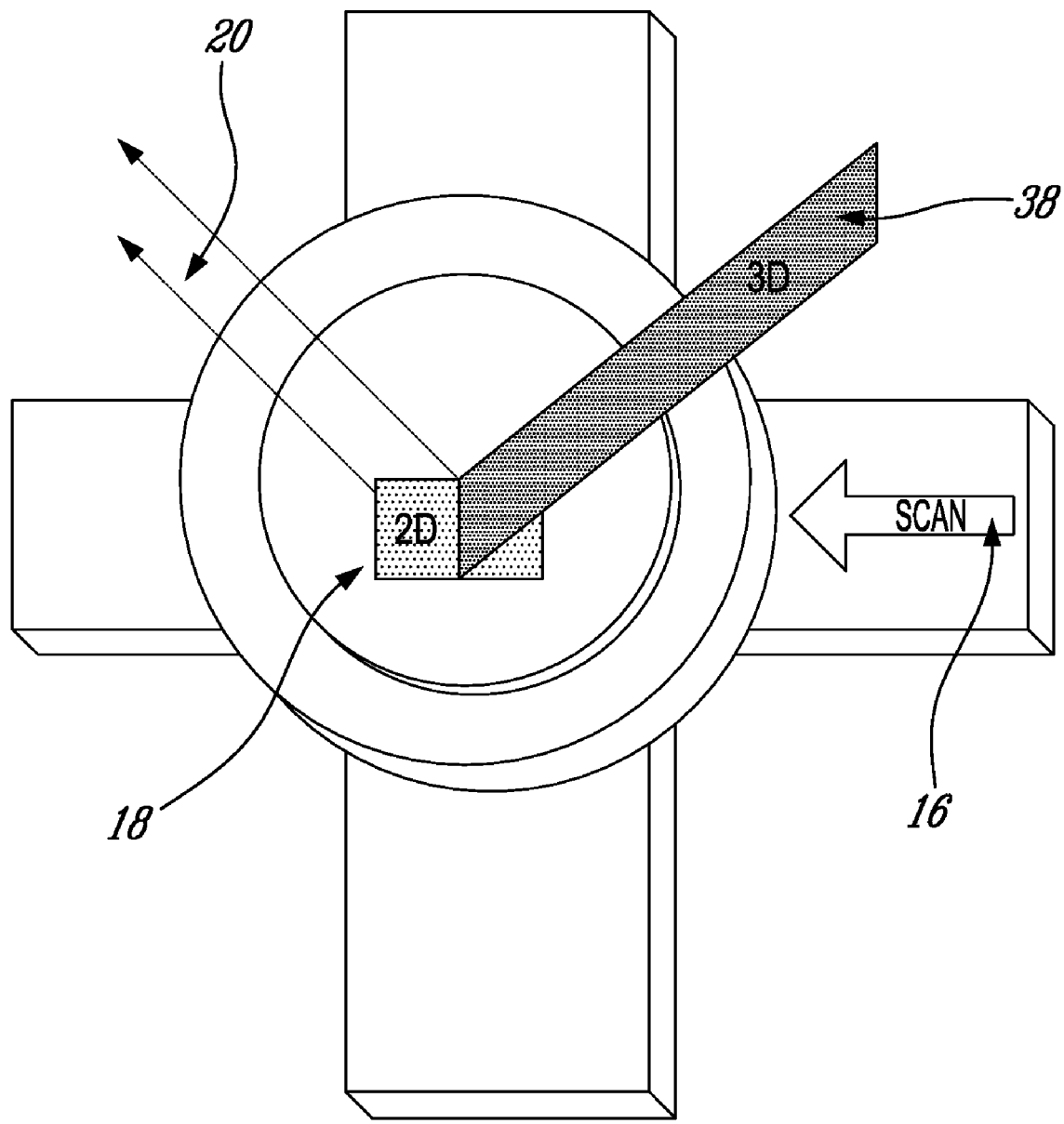
FIG. 2 is a schematic diagram of 2D and 3D scanning systems of a wafer bump optical inspection system in accordance with an illustrative embodiment of the present invention.

Referring to FIG. 2 in addition to FIG. 1, the system 10 comprises an object being inspected 12, such as a chip or substrate or the like, in the embodiment shown a substrate having a plurality of wafer bumps, disposed on a mobile stage 14 that moves with a given speed in a predetermined direction 16, such that the object being inspected 12 passes the 2D scanning system field of view 18 and the 3D scanning system field of view 20. The mobile stage 14 is linked to a motor 22 that is controlled by a scanning motion controller 24. Controller 24 controls the speed of the mobile stage 14 as a function of the scan resolution as well as the exposure time of the scanning system 10, as will be explained in further detail below. Typically, the mobile stage 14 will include a subsystem for retaining the object being inspected 12 in firm contact with the mobile stage 14, for example using a vacuum or the like (not shown).

The optical inspection system 10 comprises a 2D scanning system 26 for 2D image acquisition and a 3D scanning system 28 for profile line data acquisition. In the 2D scanning system 26 a mirror 30 reflects the image of the object being inspected 12 inside a 2D lens 32 that, in turn, conveys the reflected image inside a 2D camera 34 equipped with a laser-blocking filter (not shown). In blocking laser radiation, this filter makes it possible for the 3D scanning system 28 to work simultaneously with the 2D scanning system 26 without interfering with the 2D image acquisition. The 2D scanning system 26 and the 3D scanning system 28 are illustratively attached to a motor (not shown) or other actuator which allows the vertical distance between the 2D scanning system 26 and 3D scanning system 28 and the object being inspected 12 to be controllably varied.

The 3D scanning system 28 takes advantage of laser triangulation to determine the 3D profile line of the object being inspected 12. In the 3D scanning system 28, a laser projector 36 projects a laser plane (or swath or stripe) 38 on the object being inspected 12 which is illustratively reflected off the object being inspected 12 and acquired via a 3D lens 40 and conveyed to 3D camera 42 that measures the profile line height of the object being inspected 12. The laser projector 36 and 3D lens 40/3D camera 42 are illustratively co-arranged at 90 degrees and at 45 degrees to the plane of the object being inspected 12 and specular reflection used to convey the laser stripe 38 between the projector 36 and the camera 42. However, a person of skill in the art will understand that in a particular embodiment, for example to better avoid particular types of occlusions or reduce shadows, different angles could be selected.

The 3D camera 42 illustratively comprises a filter which blocks light other than laser radiation, such that it is possible for the 2D scanning system 26 to work simultaneously with the 3D scanning system 42 without interfering the profile line data acquisition. The optical inspection system 10 further comprises three (3) lights to enhance image acquisition quality: a top light 44, a side light 46 and a strobe ring light 48. Following acquisition of the profile line data and the 2D image of the object being inspected 12, the data is sent via output signals (not shown) to a 3D Model Generator (not shown), so that a 3D model representative of the object 12 can be generated.

Still referring to FIG. 2, the laser stripe 38 illustratively has a thickness on the order of 5 μm and a width of between about 5 mm and about 25 mm. As known in the art, lasers typically propagate as a Gaussian beam in free space and therefore the object 12 being inspected is positioned such that the object 12 falls within the depth of focus, or Rayleigh range, of the laser stripe 38.

Figure 3:
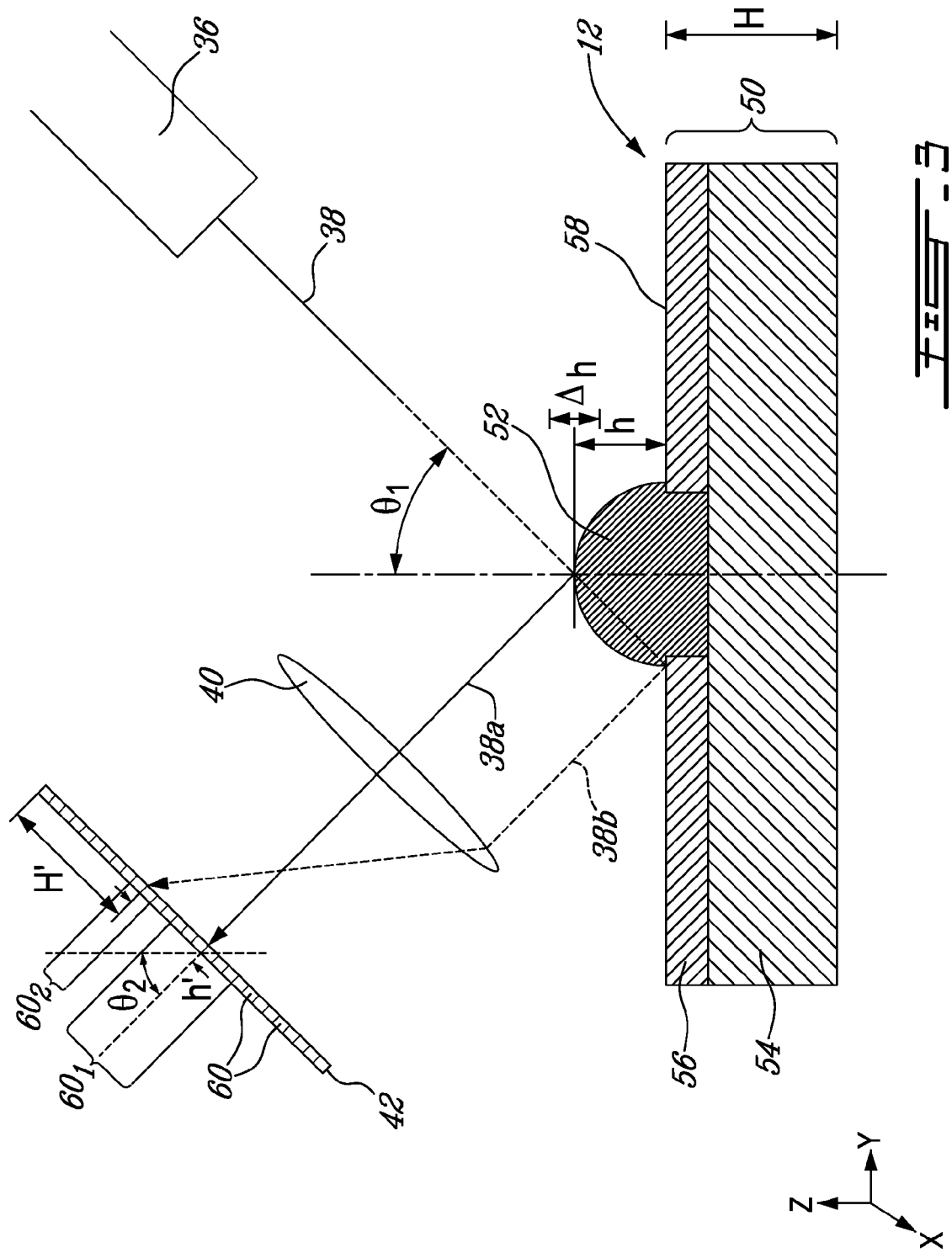
FIG. 3 is a side plan view of a substrate and wafer bump under inspection in accordance with an illustrative embodiment of the present invention.

Referring now to FIG. 3, the object being inspected 12 illustratively comprises a substrate 50 having bumps as in 52 thereon. Typically, the substrate 50 comprises a solder mask 56 coated thereon to prevent solder from bridging between conductors. When inspecting the bump 52 using the system 10, it is desirable to measure the height h of the bump 52 relative to the surface 58 of the substrate 50 in order to detect typical defects, such as oversized or undersized bumps, misshaped bumps, missing bumps, satellite bumps, or misplaced bumps. In particular, if the height h of the bump 52 is outside a tolerance range Δh, i.e. above h+Δh/2 or below h−Δh/2, it is rejected as being oversized or undersized, respectively. Additionally, it is desirable to take the height H of the substrate surface 58 into account in order to calculate the actual height h of the wafer bump 52 above the wafer surface 58. Alternatively, the height H of the substrate surface 58 can be used to controllably adjust the vertical distance between the 2D scanning system 26 and the 3D scanning system 28 and the substrate surface 58 such that, for example, the scanning systems 26, 28 "fly over" the substrate surface 58 with the laser stripe 38 focussed on the top of the bump 52. Typically, given that the substrate surface 58 of the object being inspected 12 may vary in both the direction of scanning and perpendicular to the direction of scanning, a combination of both the above techniques is used to determine the actual height h of a given wafer bump 52 above the substrate surface 58.

Still referring to FIG. 3, the laser 36 illustratively emits the beam 38 at an angle $\theta_1$ to an axis normal to the surface of the bump 52 while the 3D camera 42 is positioned on the opposite side at a second angle $\theta_2$, with $\theta_1$ and $\theta_2$ being illustratively equal to 45°. Beams as in 38, which strike the top of the bump 52, are reflected off the surface of the bump 52 into a component 38a while components of the beam 38, which strike the surface 58 of the wafer 50 are reflected into a component 38b. The 3D lens 40 is then used to focus the beams 38a and 38b onto the 3D camera 42.

The 3D camera 42 is illustratively designed and built with a high speed, high dynamic range active-pixel Complementary Metal Oxide Semiconductor (CMOS) sensor. As known in the art, CMOS sensors consist of an integrated circuit containing an array of pixel sensors as in 60, each having a photodetector (not shown) and connecting to an active transistor reset (not shown) and readout circuit (not shown).

Unlike charge-coupled devices (CCDs), CMOS cameras as in 42 use readout techniques in which the charge-to-voltage conversion takes place in each pixel 60. Using laser triangulation and knowing the angles $\theta_1$ and $\theta_2$, it is possible to compute the height h of the bump 52, which is proportional to the deformation of the beams 38a and 38b (i.e. the distance h' on the array of sensors 60). With such a setup, the imaged bumps as in 52 appear dark while the highly reflective surface 58 of the wafer 50 appears bright on the 3D model (i.e. the image) created by the 3D Model Generator.

Still referring to FIG. 3, the 3D camera 42 is controlled using a rolling shutter technique (as will be discussed in more detail below) such that the time of integration, or exposure time, of those elements of the array $60_1$ which receive laser light reflected (38a) from the bumps as in 52 is longer than that of those elements as in $60_2$ that receive laser light reflected (38b) from the surface 58 of the substrate 50. As discussed above, the surface 58 of the substrate 50 is substantially flat and reflective therefore the highly collimated laser beam 38 incident on the surface 58 of the substrate 50 is faithfully reflected (38b) using specular reflection. On the other hand, the laser beam 38 incident on the bump 52, which is also reflective and relatively smooth, is typically dispersed by the curved outer surface of the bump 52. As a result, the intensity of the reflected portion of the laser beam (38a) which strikes the array $60_1$ is significantly less than that reflected from the surface 58 of the substrate 50 which strikes the array $60_2$.

Still referring to FIG. 3, as typically only those bumps as in 52 having a height h within a range $\Delta$h are of interest, in most cases the camera 42 need only monitor reflected beams as in 38a which indicate a height within the predetermined range $\Delta$h (although in a particular application it may be wished to examiner the entire wafer bump 52). Indeed, during subsequent processing the absence of a height determination is typically taken as an indication that the particular bump 52 is well outside an acceptable range and therefore that the substrate 50 should be rejected.

Referring now to FIG. 4A, the length of exposure of pixel sensors of the array as in $60_1$ to light can be controlled using a rolling shutter comprised of a pair of pointers, or addresses, which are sequentially incremented and respectively indicate: a row of sensors as in 60 to be erased (the first pointer illustratively shown pointing to row i, indicates the address of the row to be reset through a charge dump); and a row of sensors as in 60 to be read (the second pointer shown pointing to row i-n, indicates the address of the row to be read). As the read operation is destructive, the row being read is also simultaneously reset (erased). Following reading row i-n both pointers are incremented. In this way, and as will be apparent to a person of skill in the art, all rows to be read are exposed for the time it takes to increment the pointers through "n" rows.

Still referring to FIG. 4A, for laser triangulation on a relatively flat surface such as a wafer where the objective is to measure the relative height of a bump above the relatively flat surface, a region of interest 62 can be defined which limits capture of images to the surface 58 of the substrate 56 and features above the surface 58 of the substrate 56. The region of interest can be further limited if the height of the features above to the surface 58 of the substrate 56 (such as the wafer bumps as in 52) typically remain within a predefined limit. Limiting image capture to a region of interest improves performance of the resultant system as only information of interest is captured and transferred by the array of sensors as in 60. In view of the above, it will now be apparent to a person of ordinary skill in the art that the read pointer is typically cyclically incremented between a predetermined starting value $i_{start}$ and ending value $i_{end}$ which define the region of interest 62.

Referring now to FIG. 4B in addition to FIG. 3, further improvements can be achieved by defining two regions of interest $62_1$, $62_2$. In cases such as wafer bumps as in 52 arranged on the surface 58 of a substrate 56, the surface 58 reflects a greater amount of light than the bumps as in 52. Improved exposure of such a configuration can be achieved through increases in the dynamic range. Increases in dynamic range can be achieved through provision of a mechanism for allowing different exposure times in each of the regions of interest $62_1$, $62_2$. The rolling shutter technique as described above can be used to achieve this "differential exposure" in the following manner, while at the same time further reducing the amount of information captured and transferred by the array of sensors as in 60. The address of the pointer indicating the row to be read/reset is initially set to read row i-m and the address of the pointer indicating the row to be reset is initially set to row i-n. The read/reset pointer is incremented sequentially. When the address of the read/reset pointer reaches row i-m+p-x, the address of the reset pointer, which is still pointing to set to row i-n, is sequentially incremented at the same frequency as the address of the read/reset pointer. When the address of the read/reset pointer reaches row i-m+p it is subsequently incremented to row i-n. At this point the address of the reset pointer is i-n+x. The read/reset pointer and reset pointer are sequentially incremented until the address of the read/reset pointer reaches i at which point the address of the read/reset pointer is reset to i-m and the address of the rest pointer is reset to i-n, and the process reiterated. As a result, the exposure ratio between the two regions of interest is (n+p)/x. As n and p are typically decided based on the size of the regions of interest $62_1$, $62_2$, for maximum differential exposure x is set to 1.

Referring back to FIG. 3, in an illustrative embodiment of the present invention, the 3D camera 42 uses a rolling shutter controlled by a controller (not shown, and as will be described in more detail below) such that the time of integration, or exposure, of the array of sensors 60, to the laser light as in 38a reflected from the top of the bump 52 is longer than the time of integration of the array of sensors $60_2$ receiving laser light as in 38b reflected from the surface 58 of the substrate 50. Illustratively, about 25 rows of sensors as in $60_1$ are exposed to the beams 38a while illustratively about twelve (12) rows of sensors as in $60_2$ are exposed to the beams 38b.

Using the differential exposure technique as described and the example above, the time of exposure of rows 25 through 50 will be the time it takes to read the entire frame (illustratively the time it takes to read out 37 rows of sensors as in 60). On the other hand, the time of exposure of those rows 1 through 12 which correspond to sensors as in $60_2$ receiving light reflected from the surface 58 of the substrate 50 will be the time it takes to read one (1) row of sensors as in 60 (although this can be increased as necessary by increasing the differential value x between the address of the read/reset pointer and the reset pointer as described above).

In the above configuration only a portion of the rows of sensors as in 60 of the 3D camera 42 are used to gather the 3D image of the substrate 50 and wafer bumps as in 52. Additionally, these rows of sensors as in 60, for reasons as will be discussed in more detail below, are typically clustered towards the centre of the rows of sensors as in 60 and as a result, an offset typically needs to be added to both the read/reset pointer and the reset pointer to read and reset the appropriate rows of sensors as in 60.

Figure 5B:
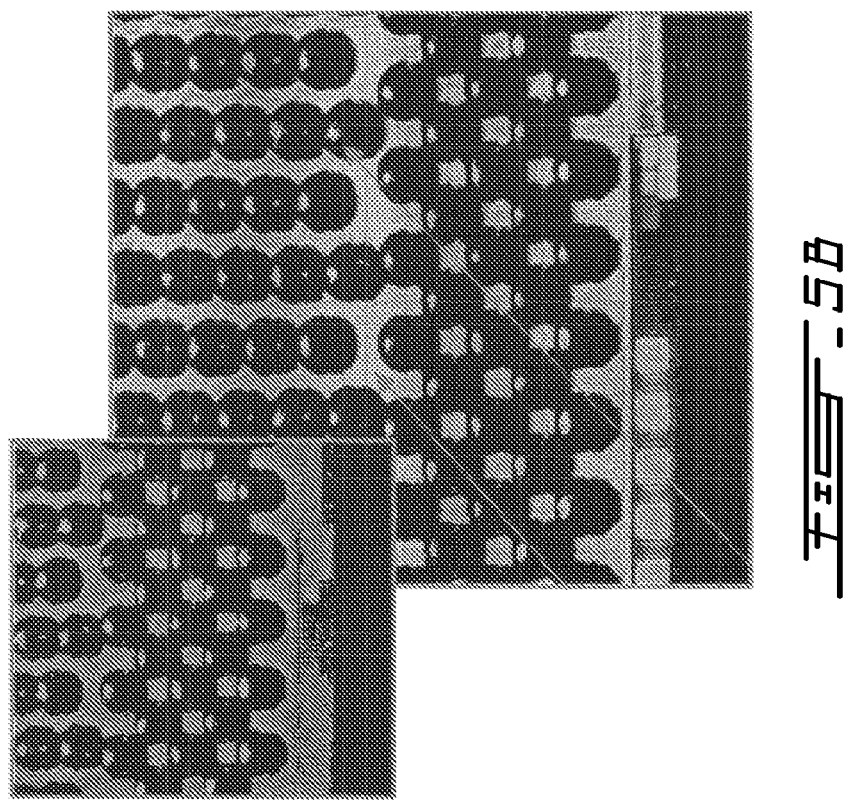
FIG. 5B is an image of a substrate and wafer bumps where differential exposure times in accordance with an illustrative embodiment of the present invention has been used.
Figure 5A:
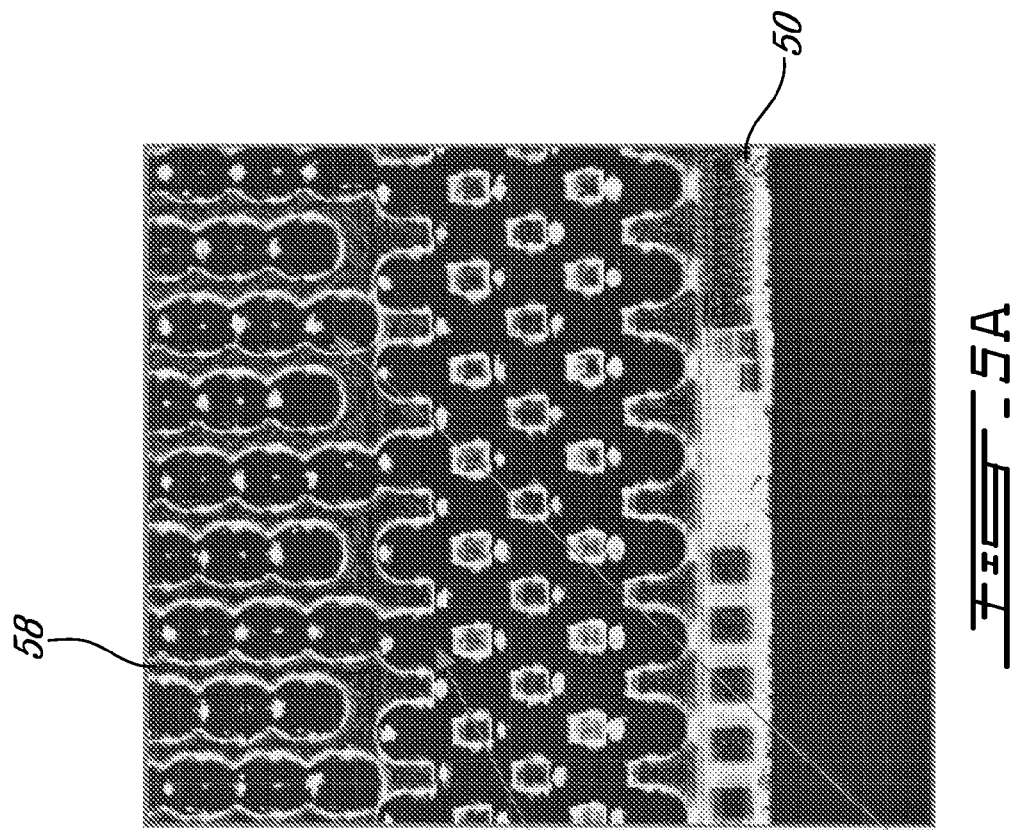
FIG. 5A is an image of a substrate and wafer bumps where differential exposure times has not been used.

Referring to FIG. 5A, as discussed above, as the surface 58 of the substrate 50 is reflective if differential exposure is not used and the time of integration is selected to ensure that light reflected from the wafer bumps as in 52 is of good quality, light reflected off the surface 58 of the substrate 50 typically over exposes the sensors and as a result the 3D image appears blurry due to bleeding between these adjacent over exposed sensors.

Referring now to FIG. 5B, the use of differential exposure corrects this defect, mitigating over exposure of the image of the surface 58 of the substrate 50 and ensuring that improved quality 3D data is acquired for both the surface 58 of the substrate 50 and the wafer bumps 52. This in turn allows for quality imaging at much higher speeds without the need for extra scans.

The rolling shutter technique can also be used to ensure that a portion of the sensors of the array 60 adjacent to the exposed sensors of the array 60 serve as buffers in the event where excessive light is incident on the exposed sensors of the array 60. Indeed, if the light incident on one or more of the sensors is of excessive brightness, a phenomenon known as bleeding or blooming, in which excess light exposure results in charge overflow at a given sensor and spilling into neighbouring sensors, is likely to occur. To overcome this problem and ensure that reliable results are obtained, the buffer sensors of the array 60 are used to contain excess charge resulting from overflow. Although they are not readout for the purpose of gathering 3D information related to the object 12 under inspection, these buffers can be reset during each frame to ensure that they do not themselves overflow.

Referring back to FIG. 3, the use of the optics as in 40 (e.g. lenses and the like) to focus the incident light in combination with the use of the rolling shutter to expose different portions of the array of sensors 60 of the 3D camera 42 results in incident light being mostly directed towards the central portion of the array 60. As illustrated, a total of about fifty (50) lines of the array of sensors as in 60 are used to image a wafer bump as in 52. As known in the art, sensor arrays such as the illustrated CMOS device, exhibit better electrical and optical characteristics in their central region than on their outer edges. Therefore the system 10, by concentrating on the central region of the array of sensors as in 60, makes efficient use of the array of sensors as in 60 and thus allows for high performance 3D bump inspection. The speed of operation is increased as well, as discussed herein above.

Although the present invention has been described hereinabove by way of specific embodiments thereof, it can be modified, without departing from the spirit and nature of the subject invention as defined in the appended claims.

What is claimed is:

1. A method for differentially exposing an object comprising a first region and a second region separate from said first region, the method comprising:
   providing a collimated beam of light;
   providing an array of light sensitive elements; and
   simultaneously illuminating at least a portion of the first region and at least a portion of the second region with said beam, wherein the first region portion illuminated by said beam is within a field of view of a first set of elements and the second region portion illuminated by said beam is within a field of view of a second set of elements;
   wherein said first set of elements is different from said second set of elements, said first set of elements are exposed to light emitted by said beam for a first amount of time and said second set of elements are exposed to light emitted by said beam for a second amount of time different from said first amount of time.

2. The method of claim 1, wherein said collimated beam of light is emitted by a laser and said array of light sensitive elements is a pixel array.

3. The method of claim 2, wherein said pixel array is a CMOS digital image sensor.

4. The method of claim 2; wherein said object is substantially flat and wherein an optical axis of said laser and an optical axis of said array form an acute angle with said substrate.

5. The method of claim 4, wherein said acute angle is about 45°.

6. The method of claim 2, wherein said source of light further comprises optics to render said beam emitted by said laser as a beam stripe.

7. The method of claim 2, wherein the object comprises a substrate, the first region comprises a surface of the substrate and the second region comprises a top of at least one bump on the substrate, wherein an intensity of said laser light reflected by said substrate is greater than an intensity of said laser light reflected by said top and further wherein said first predetermined amount of time is less than said second predetermined amount of time.

8. The method of claim 1, wherein said array comprises a plurality of rows of light sensitive elements and further wherein said first set of elements are in a first set of rows and said second set of elements are in a second set of rows different from said first set of rows.

9. A method for acquiring 3D optical inspection data of an object comprising distinct first and second regions, the method comprising:
   providing a 3D optical scanning system comprising a laser beam emitting a beam stripe and an array of light sensitive elements;
   providing relative movement between the object and said scanning system; and
   triggering profile line data acquisition of said 3D optical scanning system as a function of said relative movement, said profile line data acquisition comprising illuminating at least a portion of the first region and at least a portion of the second region with said beam stripe, wherein the first region portion illuminated by said beam stripe is within a field of view of a first set of elements and the second region portion illuminated by said beam stripe is within a field of view of a second set of elements, wherein said first set of elements is different from said second set of elements, said first set of elements are exposed to said beam for a first amount of time and said second set of elements are exposed to said beam for a second amount of time different from said first amount of time.

10. The method of claim 9, wherein the object is positioned relative to said laser such that the first region and the second region illuminated by said beam stripe fall within a Rayleigh range of said beam stripe.

11. The method of claim 10, wherein providing relative movement comprises shifting the object relative to the beam stripe in a direction at an angle to said beam stripe.

12. The method of claim 11, wherein said angle is a right angle.

13. A method for inspecting an object comprising distinct first and second regions, the method comprising:
   providing a 3D optical scanning system comprising a laser beam emitting a beam stripe and an array of light sensitive elements;

providing relative movement between the object and said scanning system;

triggering profile line data acquisition of said 3D optical scanning system as a function of said relative movement, said profile line data acquisition comprising illuminating at least a portion of the first region and at least a portion of the second region with said beam stripe, wherein the first region portion illuminated by said beam stripe is within a field of view of a first set of elements and the second region portion illuminated by said beam stripe is within a field of view of a second set of elements, wherein said first set of elements is different from said second set of elements, said first set of elements are exposed to said beam for a first amount of time and said second set of elements are exposed to said beam for a second amount of time different from said first amount of time; and generating a 3D model of said object using said profile line data.

14. The method of claim 13, wherein the object is a product and further comprising determining from said generated 3D model a fitness of the product and recycling or releasing the product as a function of said fitness.

15. The method of claim 14, wherein the product is an integrated circuit wafer whose fitness is determined by a fitness of bumps thereon.

16. An apparatus for providing 3D differential scanning of a substantially flat substrate having a plurality of raised bumps arranged along a surface thereof, the apparatus comprising:

a laser emitting a beam stripe having a Rayleigh range;

an array of light sensitive pixels, wherein said array and said laser are positioned relative to the substrate such that the surface of the substrate illuminated by said beam stripe is within a field of view of a first set of pixels and the raised bumps illuminated by said beam stripe are within a field of view of a second set of pixels; and a support for supporting the substrate, said support and said laser moveable relative to one another such that said beam stripe moves along the substrate surface while maintaining the substrate surface and the raised bumps illuminated by said beam stripe within said Rayleigh range;

wherein said first set of pixels and said second set of pixels do not overlap and further wherein a time of exposure of said first set of pixels is shorter than a time of exposure of said second set of pixels.

17. The apparatus of claim 16, wherein said array of light sensitive pixels is a CMOS digital image sensor.

18. The apparatus of claim 16, wherein said beam stripe is arranged substantially at right angles to a direction of movement of the substrate relative to said laser.

19. The apparatus of claim 16, wherein said laser emits said beam stripe in a direction at an acute angle to the substrate surface.

20. The apparatus of claim 16, wherein said laser emits said beam stripe in a direction normal to the substrate surface.

21. The apparatus of claim 16, wherein said array is substantially flat.

\* \* \* \* \*